United States Patent [19]
Kato et al.

[11] Patent Number: 4,686,580
[45] Date of Patent: Aug. 11, 1987

[54] METHOD AND APPARATUS FOR CHANGING IMAGE SIZE

[75] Inventors: Yuzo Kato, Yokohama; Hidetoshi Suzuki, Tokyo, both of Japan

[73] Assignee: Canon Kabushiki Kaisha, Tokyo, Japan

[21] Appl. No.: 577,250

[22] Filed: Feb. 6, 1984

[30] Foreign Application Priority Data

Feb. 10, 1983 [JP] Japan ................................. 58-20735
Mar. 31, 1983 [JP] Japan ................................. 58-56216

[51] Int. Cl.⁴ ............................................. H04N 1/04
[52] U.S. Cl. .................................... 358/287; 358/77; 382/47
[58] Field of Search ................... 358/287, 77; 382/9, 382/47

[56] References Cited

U.S. PATENT DOCUMENTS 4,282,550  8/1981  Coyiello ............................. 358/287
4,305,093  12/1981  Nasu .................................. 358/287
4,342,052  7/1982  Rackley et al. ..................... 358/287

Primary Examiner—Edward L. Coles, Sr.
Attorney, Agent, or Firm—Fitzpatrick, Cella, Harper & Scinto

[57] ABSTRACT

An image is magnified or reduced by dividing the image into divisional images, magnifying or reducing each of the divisional images and combining the magnified or reduced divisional images. The magnification or reduction of the divisional images is carried out by inserting one pixel into, or deleting one pixel from, each of the divisional images.

17 Claims, 18 Drawing Figures

METHOD AND APPARATUS FOR CHANGING IMAGE SIZE

BACKGROUND OF THE INVENTION

1. Field of the Invention

The present invention relates to an image processing apparatus, and more particularly to method and apparatus for changing a size of a digital image with a desired magnification.

2. Description of the Prior Art

A facsimile machine having a variable line density function has been known. It has a function which permits it to receive an original document of a size B4 and output it onto a form of a size A4. It, therefore, changes a magnification to produce a size A4 image from a size B4 image.

In the magnification changing method of this machine, a magnification of an optical system for reading density information of an image from an original document is changed in accordance with a size of the original document to be transmitted.

In this machine, the optical system is complex, which prevents cost reduction and compactness of the machine.

A word processor has a character generator pattern stored in a memory and displays or records characters by using a character generator. In an image processing apparatus, the size of the character pattern is usually fixed but there is a demand for various sizes of characters to prepare a document.

It may be attained by storing patterns of various sizes of characters in the memory. However, this requires a large capacity of memory.

In order to resolve the above problem, it has been proposed to store a pattern of one size of characters in the memory and change the size of the pattern by electrical means.

In one of the proposed methods, an image is divided to change a magnification ("Method for Expanding and Reducing a Kanji Pattern" by Inoue et al., Paper of Image Engineering Study Group, Institute of Electronics and Communication of Japan IE79-1, pp. 1–10, 1979).

In this method:

(1) The size of a pattern stored in a memory is 36×36 pixels.

(2) For changing a magnification, a 2×2 or 3×3 pixel matrix is used as a unit to divide the image.

(3) Magnifications are fixed to 3/2 and 4/3.

(4) Patterns of divisional images and patterns of magnified images are paired and stored in a memory. In changing the magnification, the pattern to which the divisional image belongs is determined and is replaced by a paired magnified pattern.

The above method has the following drawbacks.

(1) It cannot be applied to any size of image because the image size is fixed.

(2) It cannot be applied to any magnification of conversion because the magnification is fixed.

(3) It requires dividing the image in a matrix and determining the pattern to which the divisional image belongs. Therefore, processing is complex and high speed processing is not attained.

SUMMARY OF THE INVENTION

It is an object of the present invention to provide an image size changing apparatus for changing the size of an image with any magnification at a high speed.

It is another object of the present invention to provide an image size changing apparatus comprising division means for dividing a digital image into divisional images each having a number of pixels which causes the numbers of pixels in respective directions to be changed by one, respectively, a means for performing magnification changing process on the divisional images, size changing means for changing sizes of the divisional images defined by the division means, and means for combining the images whose sizes have been changed by the size changing means.

It is another object of the present invention to provide an image size changing means comprising input means for inputting the number of division by which an image is to be divided, means for dividing the image by the number of division inputted by the input means and changing magnification for each of the divisional images, and means for combining the divisional images whose magnifications have been changed to change the magnification of the image.

DETAILED DESCRIPTION OF THE PREFERRED EMBODIMENTS

Figure 1:
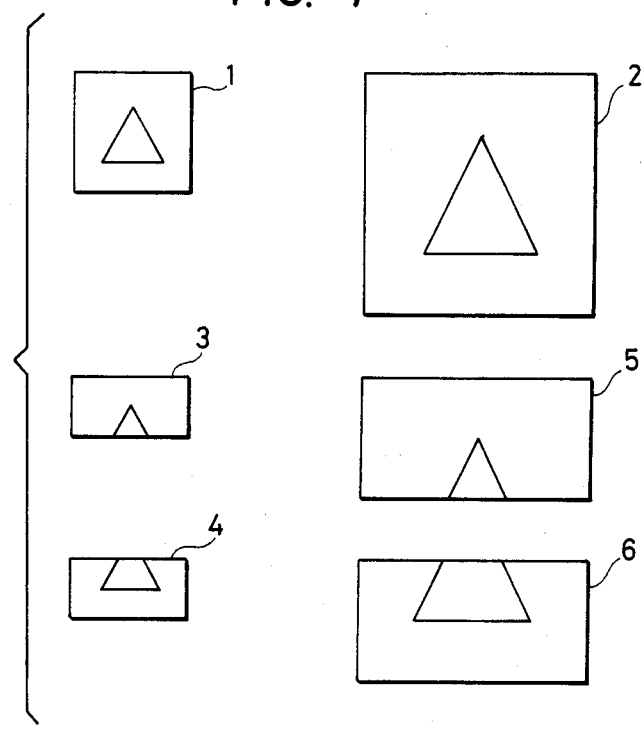
FIGS. 1 and 2 illustrate a principle of the present invention.

FIG. 1 illustrates a principle of the present invention. Numeral 1 denotes an image, numeral 2 denotes a magnified image of the image 1 with a magnification of two, numerals 3 and 4 denote divisional images of the image 1 with a division factor of two, and numerals 5 and 6 denote magnified images of the images 3 and 4, respectively, with a magnification of two.

The principle of the present invention will be described with reference to FIG. 1. The magnified image 2 of the image 1 can be obtained by magnifying the divisional images 3 and 4 of the image 1 and combining the magnified divisional images 5 and 6. It is seen from FIG. 1 that a magnified image of an original image can be obtained by dividing the original image into any number of divisional images, magnifying the respective divisional images and combining the magnified divisional images. The present invention efficiently utilizes the above property.

Figure 2:
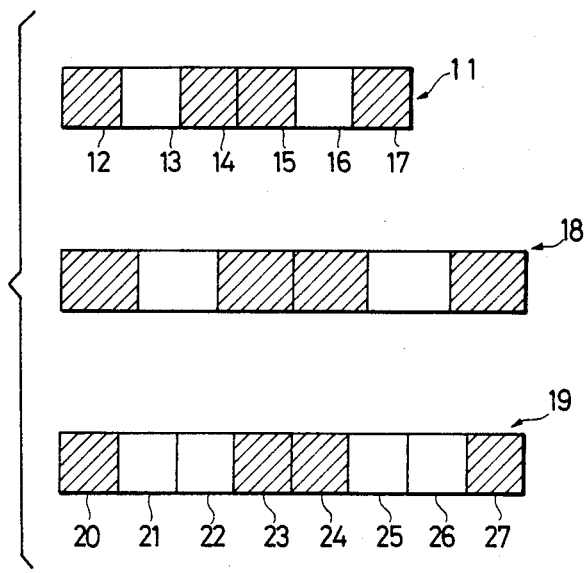

FIG. 2 illustrates a principle of the present invention. Numeral 11 denotes one line of digital image, numerals 12-17 denote pixels in the image 11, numeral 18 denotes a magnified analog image of the image 11, numeral 19 denotes a digitized image of the image 18, and numerals 20-27 denote pixels in the image 19.

A magnification change of the digital image will be explained with reference to FIG. 2. In the magnification change of the digital image, both an image to be magnified and a magnified image are digital images.

The image 18 is a photographically magnified analog image of the digital image 11. When the image 11 is to be digitally magnified, the analog image 18 is sampled and quantized to produce the digital image 19. However, the photographic magnification, the sampling and the quantization are carried out by complex calculation processes.

The inventors of the present invention discovered a very simple rule by which the digital image is divided and one pixel is added to or subtracted from each of the divisional images.

Figure 3:
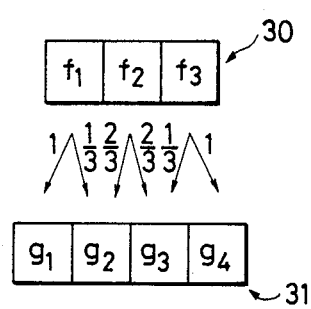
FIG. 3 shows a relationship among images.

FIG. 3 shows a relationship among images. Numeral 30 denotes a divisional image and numeral 31 denotes a magnified image of the divisional image 30. The number of pixels of the image 31 is one larger than the number of pixels of the image 30. In FIG. 3, $f_1-f_3$ and $g_1-g_4$ represent the amplitudes of the respective pixels. The amplitude of the ith pixel of the image 31 is determined by the amplitudes of the (i−1)th and ith pixels. For binary images, the following relationships exist among $f_1-f_3$ and $g_1-g_4$.

$$g_1 = D[f_1] = f_1 \quad (1)$$

$$g_2 = D[\tfrac{1}{3}f_1 + \tfrac{2}{3}f_2] = f_2 \quad (2)$$

$$g_3 = D[\tfrac{2}{3}f_2 + \tfrac{1}{3}f_3] = f_2 \quad (3)$$

$$g_4 = D[f_3] = f_3 \quad (4)$$

where D is a quantization function element. For example $$D[x] = 1 \text{ if } 1 \geq x \geq \tfrac{1}{2} \quad (5)$$

$$D[x] = 0 \text{ if } \tfrac{1}{2} > x \geq 0 \quad (6)$$

From the equations (1)-(4), the image 31 can be produced by inserting one pixel between the first and second pixels or the second and third pixels of the image 30 and setting the amplitude thereof to be equal to that of the second pixel.

The number of pixels of the divisional image increases or decreases by one by the magnification change process but there is no retriction on the position of the division. Accordingly, the position of the pixel to be inserted or deleted in the magnification process or the reduction process, respectively, can be appropriately designated prior to the process. The amplitude of the pixel to be inserted can be determined by the amplitude of the pixel adjacent to the insertion position. For example, the amplitude may be (1) the amplitude of one of the adjacent pixels, or
(2) a logical OR of the amplitudes of the two adjacent pixels.

Figure 4:
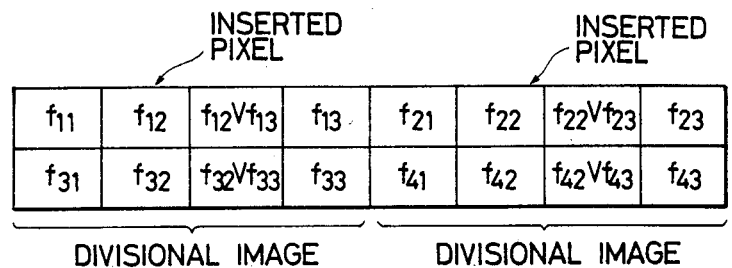
FIG. 4 illustrates an embodiment of a magnifying process usable in practicing the present invention.

FIG. 4 shows an embodiment of a magnification process.

Conditions under which the number of pixels of the divisional image increases or decreases by one are expressed as follows:

(1) when $2 > A > 1$, $$m = \left[ \frac{1}{A - 1} \right] \quad (7)$$

or $$m = \left[ \frac{1}{A - 1} + \frac{1}{2} \right] \quad (8)$$

(2) when $1 > A > \tfrac{1}{2}$, $$m = \left[ \frac{1}{1 - A} \right] \quad (9)$$

or $$m = \left[ \frac{1}{1 - A} + \frac{1}{2} \right] \quad (10)$$

where m is the number of pixels of the divisional image. A is the magnification and [x] is the largest integer no larger than x.

Any of the equations (7)-(10) can be appropriately designated.

While a one-dimensional image has been explained, if a two-dimenisonal image is to be processed, similar processes may be performed for the respective directions. When the magnification is larger than 2 or smaller than $\tfrac{1}{2}$, the above magnification changing process may be repeated.

Figure 5:
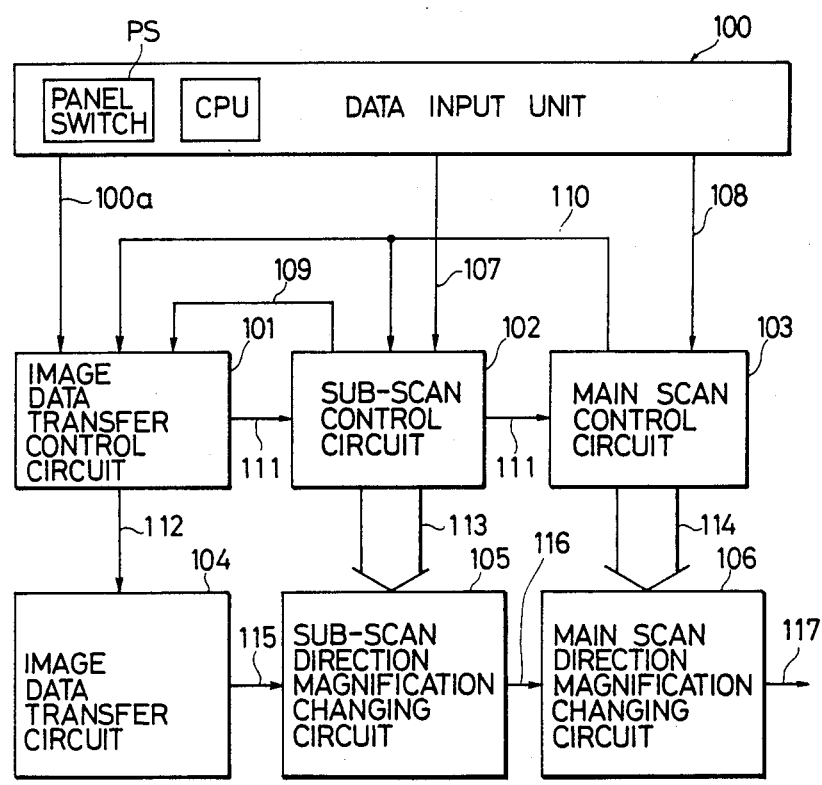
FIG. 5 shows an embodiment of the present invention.

Referring to FIG. 5, numeral 100 denotes a data input unit, and numeral 100a denotes a signal which designates the number of pixels of an image. The data input unit 100 comprises a panel switch PS for setting magnifications and numbers of pixels in a main scan direction (horizontal) and a sub-scan direction (vertical), a processor CPU for calculating the number of pixels of a divisional image based on the magnification, and a circuit for transferring those values to control circuits. By changing the count (the number of pixels of the image) of a counter 121 (see FIG. 7) which counts the number of transferred pixels in an image data transfer control circuit 101, the size of the image can be changed with any magnification. Numeral 101 denotes the image data transfer control circuit, numeral 102 denotes a sub-scan control circuit, numeral 103 denotes a main scan control circuit, numeral 104 denotes an image data transfer circuit, numeral 105 denotes a sub-scan direction magnification changing circuit, numeral 106 denotes a main scan direction magnification changing circuit, numeral 107 denotes a signal line for externally setting the number of pixels of the divisional image in the sub-scan direction, numeral 108 denotes a signal line for externally setting the number of pixels of the divisional image in the main scan direction, numeral 109 denotes a signal line for designating the insertion or the deletion of the pixel in the sub-scan direction, numeral 110 denotes a signal line for designating the insertion or the deletion of the pixel in the main scan direction, numerals 111 denote a clock signal line, numeral 112 denotes a signal line for controlling the transfer of the image data, numeral 113 denotes a signal line for controlling the circuit 105, numeral 114 denotes a signal line for controlling the circuit 106, and numerals 115–117 denote signal lines for transferring the image data.

The operation will now be explained.

Figure 6:
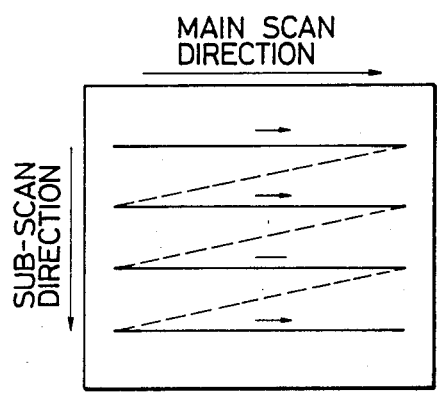
FIG. 6 shows a sequence of transfer of image data.

The present embodiment is operated in synchronism with the clock signal generated in the image data transfer control circuit 101. The numbers of pixels of the divisional image calculated by the data input unit 100 in accordance with the equations (7)–(10) are set to the sub-scan control circuit 102 and the main scan control circuit 103 through the signal lines 107 and 108, respectively. The image data transfer control circuit 101 issues as many image data transfer request signals as the number of pixels in the image except when the pixels in the main scan direction and the sub-scan direction are to be inserted or deleted. The image data transfer circuit 104 stores the image data in a memory or scans the image data and transfers each pixel of image data in response to the image data transfer request signal in a sequence shown in FIG. 6. Except when the pixel in the main scan direction is to be inserted or deleted, the sub-scan control circuit 102 checks the time to insert or delete the pixels (one line of pixels) in the sub-scan direction and transfers the control signal 113 to the sub-scan direction magnification changing circuit 105, which responds to the control signal 113 to insert or delete one line of pixels at the time to insert or delete the pixels. It, therefore, carries out the sub-scan direction magnification changing operation. The main scan control circuit 103 controls the insertion or the deletion of the pixel in the main scan direction and transfers the control signal 114 to the main scan direction magnification changing circuit 106, which responds to the control signal 104 to insert or delete one pixel at the time to insert or delete the pixel. It, therefore, carries out the main scan direction magnification changing operation.

In the present embodiment, the sequence of the sub-scan direction magnification changing operation and the main scan direction magnification changing operation may be reversed.

The image data transfer control circuit 101 will now be explained with reference to FIG. 7.

Figure 7:
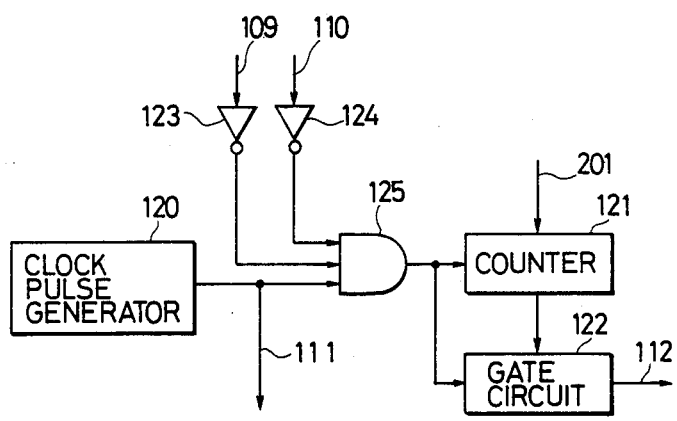
FIG. 7 shows an embodiment of an image data transfer circuit.

FIG. 7 shows an embodiment of the image data transfer control circuit. Numeral 120 denotes a clock pulse generator, numeral 121 denotes a counter, numeral 122 denotes a gate circuit, numerals 123 and 124 denote inverters and numeral 125 denotes a 3-input AND gate. The operation is described below.

The clock pulse generator 120 generates a clock pulse signal during the operation of the system. Numerals 109 and 110 denote the control signals from the sub-scan control circuit and the main scan control circuit, respectively, and the counter 121 counts the clock pulse signal while the control signals 109 and 110 are absent and opens the gate circuit 122 until the count reaches the number of pixels in the image to cause the gate circuit 122 to produce the image data transfer request signal 112. Each pulse of the image data transfer request signal 112 requests the image data transfer circuit 104 to transfer one pixel of data.

The sub-scan control circuit 102 shown in FIG. 5 will now be explained in detail.

Figure 8:
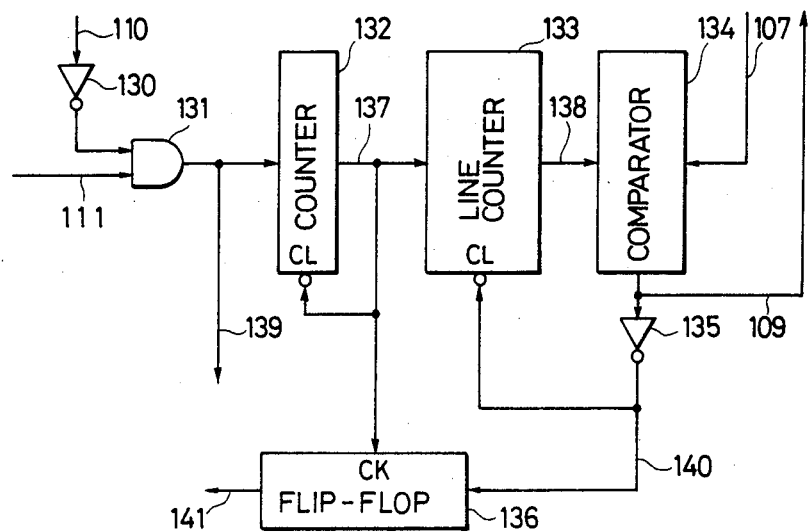
FIG. 8 shows an embodiment of a sub-scan control circuit.

FIG. 8 shows an embodiment of the sub-scan control circuit 102. Numeral 130 denotes an inverter, numeral 131 denotes an AND gate, numeral 132 denotes a clock pulse counter, numeral 133 denotes a line counter, numeral 134 denotes a comparator, numeral 135 denotes an inverter, numeral 136 denotes a D flip-flop, numerals 137 and 138 denote internal signals and numerals 139, 140 and 141 denote signals to control the sub-scan direction magnification changing circuit 105.

Figure 9:
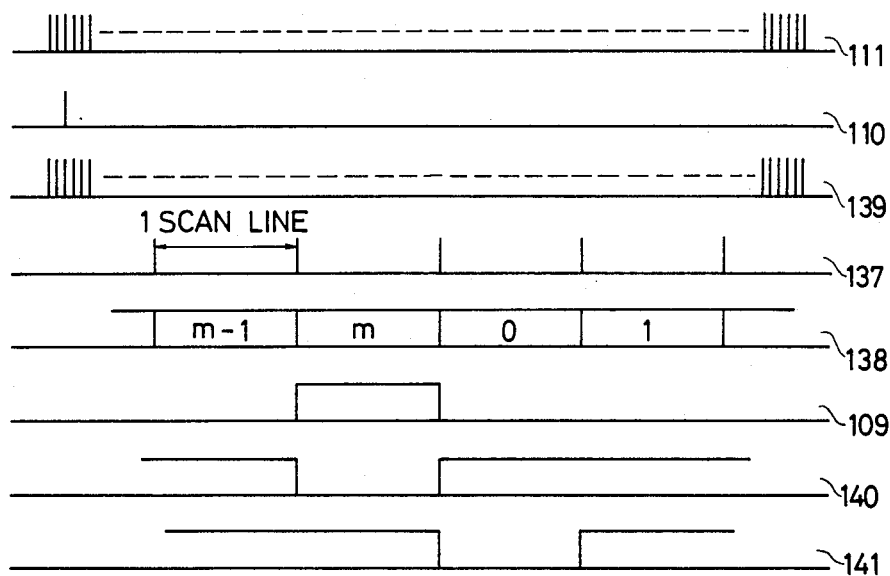
FIG. 9 shows a timing chart for signals shown in FIG. 8.

FIG. 9 shows a timing chart for the signals 109–111 and 137–141 shown in FIG. 8. The operation will now be described.

The clock pulse signal 111 is used as a synchronizing signal for the system. The signal 139 which is a logical AND function of the signal 111 and the control signal 110 from the main scan control circuit is equivalent to the signal 111 from which the pulse signal at the time of the control signal 110 is deleted, and it is used as a synchronizing signal for the sub-scan direction magnification changing circuit 105. The signal 139 is also synchronized with the pixel data transfer signal 115. The counter 132 counts the number of pulses of the signal 139, that is, the number of transferred pixels and produces a pulse when the count reaches the number of pixels in one scan line. The signal 137 is thus a pulse signal synchronized with the start of each line scan. The line counter 133 counts the number of scan lines of the transferred pixels. The number of pixels of the divisional image in the sub-scan direction, that is, the number of scan lines, is externally set to the comparator 134. If the number m is set and the count of the line counter 133 reaches m, the line counter 133 produces the signal 109. The signals 109 and 140 control the insertion time of the pixels (lines) in the sub-scan direction and clear the line counter 133. The D flip-flop 136 delays the signal 140 by one scan line period and produces the signal 141. The sub-scan direction magnification changing circuit is controlled by the signals 139 and 141.

The sub-scan direction magnification changing circuit shown in FIG. 5 will now be explained.

Figure 10:
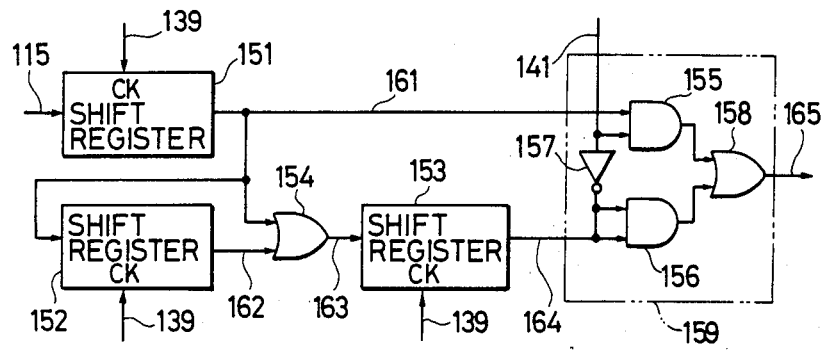
FIG. 10 shows an embodiment of a sub-scan direction magnification changing circuit.

FIG. 10 shows one embodiment of the sub-scan direction magnification changing circuit. Numerals 151–153 denote shift registers each having as many stages as the number of pixels in one line, numeral 154 denotes a logical OR gate, numerals 155 and 156 denotes logical AND gates, numeral 157 denotes an inverter, numeral 158 denotes a logical OR gate, numeral 159 denotes a signal selection circuit and numerals 161–165 denote internal signals.

Figure 11:
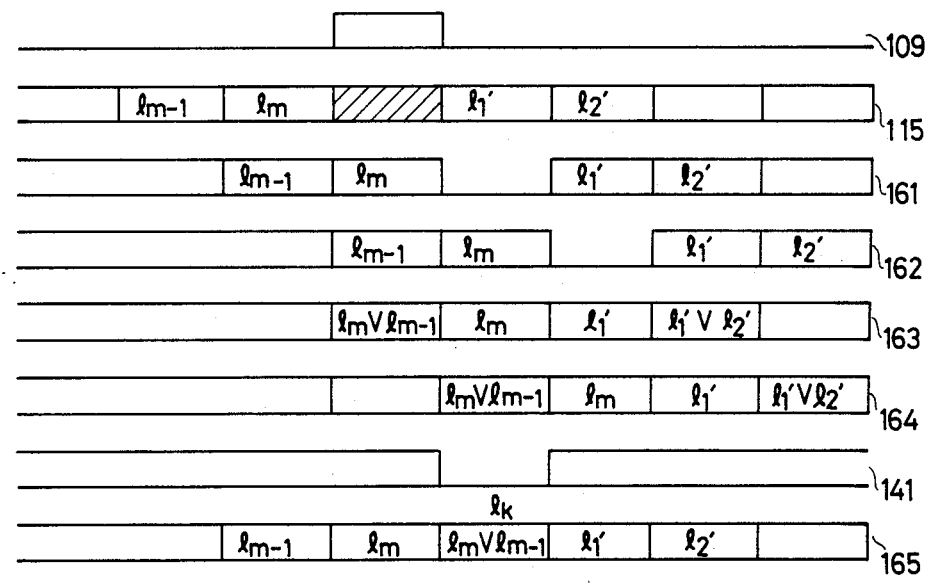
FIG. 11 shows a timing chart for signals shown in FIG. 10.

FIG. 11 shows a timing chart for the signals. The operation is described below.

The image data signal 115 is transferred from the image data transfer circuit 104 in a sequence shown in FIG. 11. A hatched area shows a period in which the image data is not transferred because of the control signal 109 as explained above. The image data signal 115 is supplied to the shift register 151 which produces the signal 161, which in turn is supplied to the signal selection circuit 159. The signal 161 is also supplied to the shift register 152 and the OR gate 154, which produces the signal 163, which in turn produces the signal 164, which is supplied to the signal selection circuit 159. The signal selection circuit 159 selects the signal 161 or the signal 164 in accordance with the control signal 141 to produce the signal 165. In the present embodiment, one line of pixels are inserted for each m lines so that the magnification is changed by a factor of (m+1)/m in the sub-scan direction. The value m is supplied from the input unit 100 and hence it is variable.

In the above embodiment, lk is determined by the logical OR function of $l_{m-1}$ and lm, although it is not restrictive.

The main scan control circuit shown in FIG. 5 will not be explained in detail.

Figure 12:
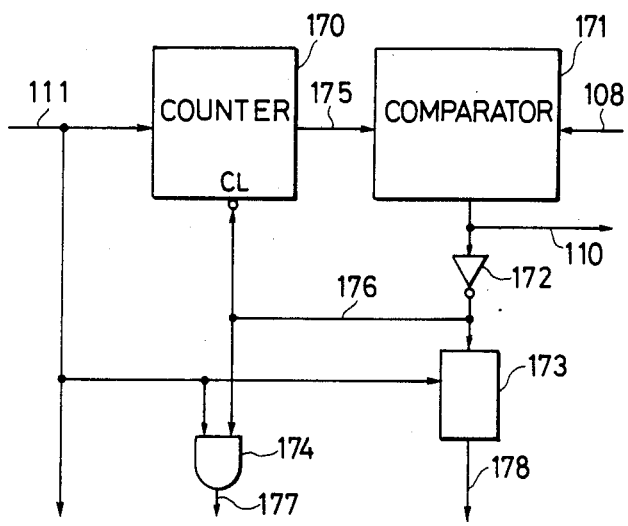
FIG. 12 shows an embodiment of a main scan control circuit.

FIG. 12 shows an embodiment of the main scan control circuit. Numeral 170 denotes a counter, numeral 171 denotes a comparator, numeral 172 denotes an inverter, numeral 173 denotes a shift register, numeral 174 denotes an AND gate and numerals 175-178 denote signals.

Figure 13:
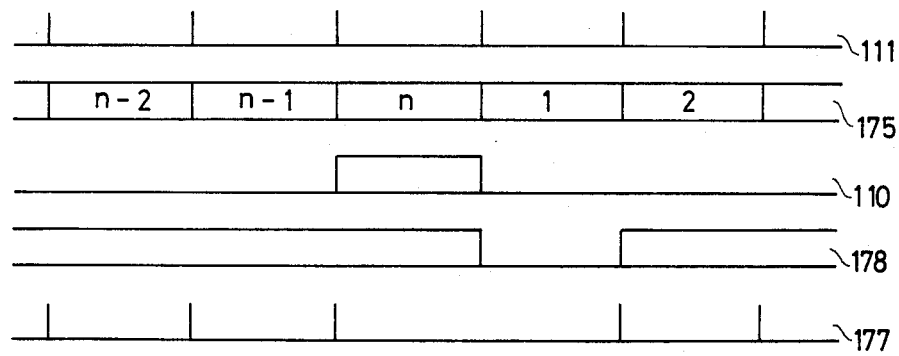
FIG. 13 shows a timing chart for signals shown in FIG. 12.

FIG. 13 shows a timing chart for the signals. The operation will now be described.

The number of pixels (n) of the divisional image in the main scan direction is externally set to the comparator 171 through the signal line 108. The clock pulse signal 111 is counted by the counter 170 and the content thereof is compared with the value set in the comparator 171. When they are equal, the comparator 171 produces the signal 110. The signal 110 controls the image data transfer control circuit 101 and the sub-scan control circuit. The signal 176 clears the counter 170 and supplied to the AND gate 174 and the D flip-flop 173. The signal 176 supplied to the D flip-flop 173 is delayed one clock period and produced as the signal 178. The signal 111 is a system synchronizing signal, the signal 177 is a pixel insertion/deletion control signal, and the signal 178 is a signal selection control signal, and they are supplied to the main scan direction magnification changing circuit.

The main scan direction magnification changing circuit will now be explained in detail.

Figure 14:
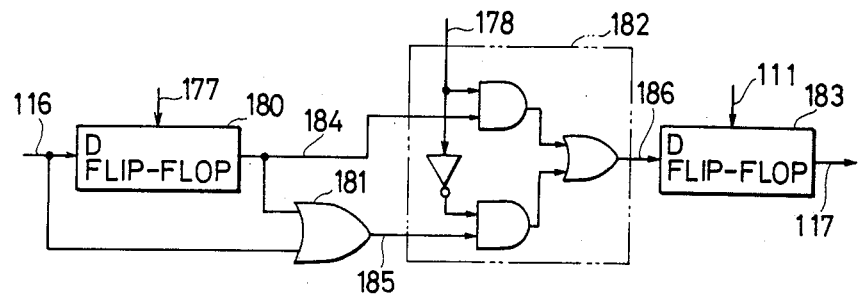
FIG. 14 shows an embodiment of a main scan direction magnification changing circuit.

FIG. 14 shows an embodiment of the main scan direction magnification changing circuit. Numeral 180 denotes a D flip-flop, numeral 181 denotes an OR gate, numeral 182 denotes a signal selection circuit, numeral 183 denotes a D flip-flop and numerals 184-186 denote signals.

Figure 15:
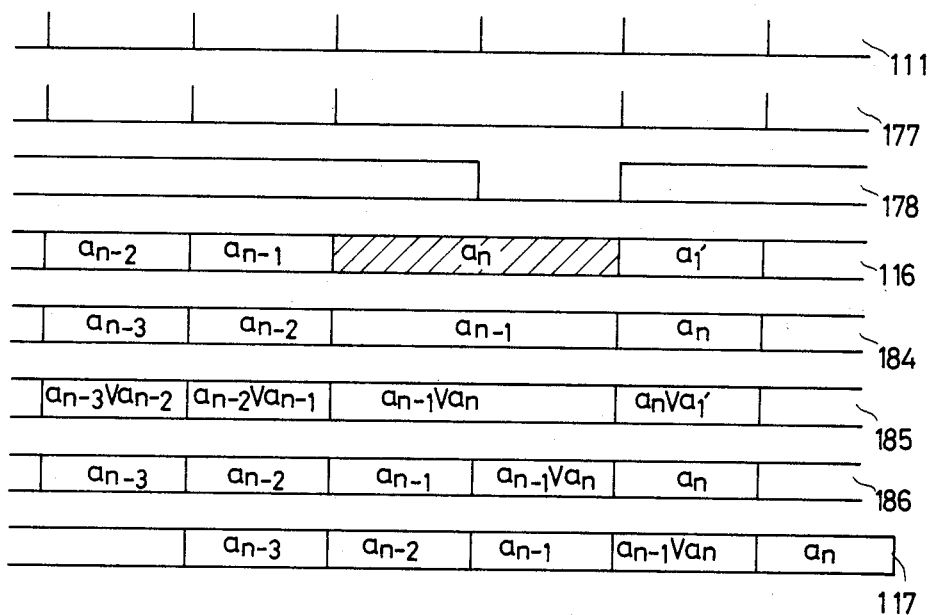
FIG. 15 shows a timing chart for signals shown in FIG. 14.

FIG. 15 shows a timing chart for the signals. The operation is explained below.

The signal 116 is supplied in a sequence shown in FIG. 15. In a period shown by a hatched area, $a_n$ is held by the control signal 110 supplied to the sub-scan control circuit 102 so that it has a double duration as compared to those of other signals. The signal 116 is supplied to the D flip-flop 180 which produces the signal 184, which in turn is supplied to the signal selection circuit 182 and the OR gate 181. The OR gate 181 OR's the signals 116 and 184 to produce the signal 185. The signal selection circuit 186 selects the signal 184 or the signal 185 in accordance with the control signal 178 to produce the signal 186.

The relationship among the signals is shown in FIG. 15. In the present embodiment, the signal 186 is supplied to the other D flip-flop 183, which produces the output signal 117. (The D flip-flop 183 is used to shape the signal.) In the present embodiment, a signal having an amplitude equal to an OR function of $a_{n-1}$ and $a_n$ is inserted, although that approach is not the only one within the scope of the invention.

As described hereinabove, according to the present embodiment, one pixel is inserted for every n pixels in the main scan direction so that the image is magnified by a factor of (n+1)/n. The value n is externally set and hence it is variable.

While the magnification of the image has been described above, the present invention is not limited to the magnification process. In a reduction process, a reduction circuit is provided for each of the magnification changing circuits and one pixel or one line of pixels is deleted by the circuits.

When the magnification process and the reduction process are to be selectively used, the magnification circuit and the reduction circuit are provided for each magnification changing circuit and a magnification/reduction select circuit is provided for the control circuit to produce a magnification/reduction select signal.

As described hereinabove, by inserting or deleting one pixel by dividing the image such that the number of pixels increases or decreases by one through the magnification changing process, the magnification can be changed. Thus, the hardware configuration is simplified and a high speed process is attained.

In the magnification process, the amplitude of the pixel to be inserted depends only on the amplitudes of the adjacent pixels in the direction of magnification and does not depend on the amplitudes of other pixels. Accordingly, the process is simplified and a sequential process can be attained.

Since the sequential process can be applied to any size of digital image, the present invention is applicable to a digital printer such as a facsimile and a digital display such as a liquid crystal display.

An improvement over the embodiment described above will now be explained with reference to the same drawings.

In the above embodiment, the digital image is divided, the divisional images are magnified and the magnified divisional images are combined. The number of pixels in the divisional image is determined by the magnification A in accordance with the equations (1)-(4), as shown below. When $2 > A > 1$ $$m = \left[ \frac{1}{A - 1} \right] \tag{1}$$

or $$m = \left[ \frac{1}{A - 1} + \frac{1}{2} \right] \tag{2}$$

when $1 > A > \frac{1}{2}$ $$m = \left[ \frac{1}{1 - A} \right] \tag{3}$$

or $$m = \left[ \frac{1}{1 - A} + \frac{1}{2} \right] \tag{4}$$

where m is the number of pixels in the divisional image and [x] is the largest integer no larger than x. In this method, a high precision magnification change may not be attained because of a rounding error or a truncation error in the equations (1)-(4).

In the second embodiment of the present invention, a high precision magnification change is attained. The second embodiment of the present invention will not be explained with reference to FIG. 1.

The magnified image 2 of the image 1 is formed by magnifying the divisional images 3 and 4 of the image 1 and combining the magnified divisional images 5 and 6. It is seen from FIG. 1 that a magnified image of an original image can be obtained by dividing the original image into any number of divisional images, magnifying the respective divisional images and combining the magnified divisional images. The present invention efficiently utilizes the above property.

FIG. 2 illustrates a principle of the present invention. Numeral 11 denotes one line of digital image, numerals 12-17 denote pixels in the image 11, numeral 18 denotes a magnified analog image of the image 11, numeral 19 denotes a digitized image of the image 18, and numerals 20-27 denote pixels in the image 19.

A magnification change of the digital image will be explained with reference to FIG. 2. In the magnification change of the digital image, both the image to be magnified and the magnified image are digital images.

The image 18 is a photographically magnified analog image of the digital image 11. When the image 11 is to be digitally magnified, the analog image 18 is sampled and quantized to produce the digital image 19. However, the photographic magnification, the sampling and the quantization are carried out by complex calculation processes.

The inventors of the present invention have discovered a very simple rule by which the digital image is divided and one pixels is added to or subtracted from each of the divisional images.

FIG. 3 shows a relationship among images. Numeral 30 denotes a divisional image and numeral 31 denotes a magnified image of the divisional image 30. The number of pixels of the image 31 is one larger than the number of pixels of the image 30. In FIG. 3, $f_1-f_3$ and $g_1-g_4$ represent amplitudes of the respective pixels. The amplitude of the i-th pixel of the image 31 is determined by the amplitudes of the (i−1)th and i-th pixels. For binary images, the following relationships exist among $f_1-f_3$ and $g_1-g_4$:

$$g_1 = D[f_1] = f_1 \quad (1)$$

$$g_2 = D[\tfrac{1}{3}f_1 + \tfrac{2}{3}f_2] = f_2 \quad (2)$$

$$g_3 = D[\tfrac{2}{3}f_2 + \tfrac{1}{3}f_3] = f_2 \quad (3)$$

$$g_4 = D[f_3] = f_3 \quad (4)$$

where D is a quantization function element. For example $$D[x] = 1 \text{ if } 1 \geq x \geq \tfrac{1}{2} \quad (5)$$

$$D[x] = 0 \text{ if } \tfrac{1}{2} \geq x \geq 0 \quad (6)$$

From the equations (1)-(4), the image 31 can be produced by inserting one pixel between the first and second pixels or the second and third pixels of the image 30 and setting the amplitude thereof to be equal to that of the second pixel.

The number of pixels of the divisional image increasese or decreases by one by the magnification change process but there is no restriction on the position of the division. Accordingly, the position of one pixel to be inserted in the magnification process and the position of one pixel to be deleted in the reduction process can be appropriately designated prior to the process. The amplitude of the pixel to be inserted can be determined by the amplitude of the pixel adjacent to the insertion position. For example, the amplitude may be (1) the amplitude of one of the adjacent pixels, or (2) a logical OR of the amplitudes of the two adjacent pixels.

FIG. 4 shows an embodiment of a magnification process.

In order to attain a high precision magnification change, it is necessary to divide the image in the respective directions into as many divisional images as the number of differences between the numbers of pixels before magnification and the numbers of pixels after the magnification in the respective directions, and magnify the divisional images in accordance with the magnification process described above.

A specific example is described below.

Assuming that the number of pixels in one direction of the image to be magnified is k, a magnification is A ($2 \geq A \geq \tfrac{1}{2}$) and the number of pixels after the magnification is K, there exists a relation of $$K = [AK] \quad (7)$$

or $$K = [AK + \tfrac{1}{2}] \quad (8)$$

The difference n between the numbers of pixels before and after the magnification is given by $$n = |K - k| \quad (9)$$

The number of pixels in the divisional image is given by equations (10)-(12).

(1) When the quotient k/n is an integer, the number of pixels $m_1$ in each of n divisional images is given by $$m_1 = k/n \quad (10)$$

(2) When the quotient k/n is not an integer or has a residue, the number of pixels $m_1$ in each of (n−k+n[k/n]) divisional images is given by $$m_1 = [k/n] \quad (11)$$

the number of pixels $m_2$ in each of (k−n[k/n]) divisional images is given by $$m_2 = [k/n] + 1 \quad (12)$$

In each of the above cases, by increasing or decreasing one pixel in magnifying the divisional image, the total number of pixels k in the image is equal to K after the magnification. Thus, the high precision magnification is attained.

While the one-dimensional image has been described above, when a two dimensional image is to be magnified, the above process may be repeated for the respective directions. When the magnification is larger than two or smaller than 178, the above process may be repeated.

Figure 17:
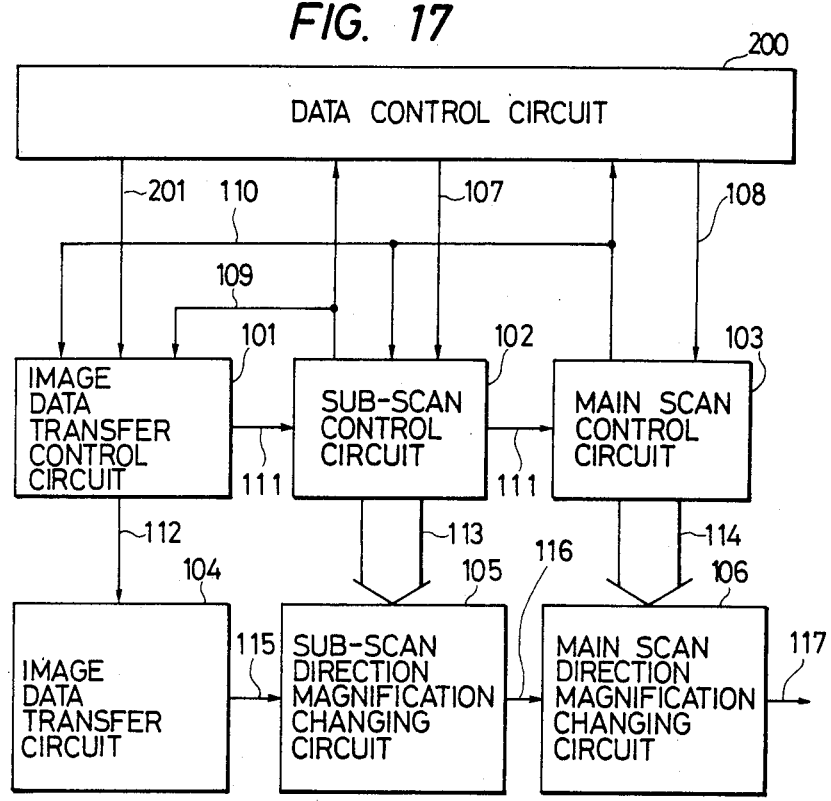
FIG. 17 shows another embodiment of the present invention.

FIG. 17 shows the second embodiment of the present invention. Numeral 101 denotes an image data transfer control circuit, numeral 102 denotes a sub-scan control circuit, numeral 103 denotes a main scan control circuit, numeral 104 denotes an image data transfer circuit, numeral 105 denotes a sub-scan direction magnification changing circuit, numeral 106 denotes a main scan direction magnification changing circuit, numeral 200 denotes a data control circuit and numerals 107-117 and 201-203 denote signals.

The operation is described below.

The total number of pixels of the image, the numbers of divisional images in the respective directions determined by the equation (7) and the numbers of pixels in the divisional images determined by the equations (10)–(12) are set to the data control circuit from an external panel switch in a sequence of process for each of the divisional images in the respective directions.

The numbers of pixels in the divisional images are set to the sub-scan control circuit 102 and the main scan control circuit 103 through the signal lines 107 and 108 in accordance with the control signals 109 and 110, respectively.

The present embodiment is operated in synchronism with the clock signal 111 generated by the image data transfer control circuit 101. The image data transfer control circuit 101 produces as many image data transfer request signals as the number of pixels in the image except when the pixels in the main scan direction and the sub-scan direction are to be inserted or deleted. The image data transfer circuit 104 stores the image data in a memory or scans the image to transfer one pixel of image data in response to the image data transfer request signal in a sequence shown in FIG. 6. Except when the pixel in the main scan direction is to be inserted or deleted, the sub-scan control circuit 102 checks the time to insert or delete the pixels (one line of pixels) in the subscan direction and transfers the control signal 113 to the sub-scan direction magnification changing circuit 105 and the control signal 202 to the data control circuit 200. The sub-scan direction magnification changing circuit 105 responds to the control signal 113 to insert or delete one line of pixels at the time to insert or delete the pixels. It, therefore, carries out the sub-scan direction magnification changing operation. The main scan control circuit 103 controls the insertion or the deletion of the pixel in the main scan direction and transfers the control signal 114 to the main scan direction magnification changing circuit 106 and the control signal 203 to the data control circuit 200. The main scan direction magnification changing circuit 106 responds to the control signal 114 to insert or delete one pixel at the time to insert or delete the pixel. It, therefore, carries out the main scan direction magnification changing operation.

In the present embodiment, the sequence of the sub-scan direction magnification changing operation and the main scan direction magnification changing operation may be reversed.

FIG. 7 shows an embodiment of the image data transfer control circuit. Numeral 120 denotes a clock pulse generator, numeral 121 denotes a counter, numeral 122 denotes a gate circuit, numerals 123 and 124 denote inverters and numeral 125 denotes a 3-input AND gate. The operation is described below.

The clock pulse generator 120 generates a clock pulse signal during the operation of the system. Numerals 109 and 110 denote the control signals from the sub-scan control circuit and the main scan control circuit, respectively, and the counter 121 counts the clock pulse signal white the control signals 109 and 110 are absent and opens the gate circuit 122 until the count reaches the number of pixels in the image preset in the data control circuit 200 by the signal 201 to cause the gate circuit 122 to produce the image data transfer request signal 112. Each pulse of the image data transfer request signal 112 requests the image data transfer circuit 104 to transfer one pixel of data.

FIG. 8 shows an embodiment of the sub-scan control circuit 102. Numeral 130 denotes an inverter, numeral 131 denotes an AND gate, numeral 132 denotes a clock pulse counter, numeral 133 denotes a line counter, numeral 134 denotes a comparator, numeral 135 denotes an inverter, numeral 136 denotes a D flip-flop, numerals 137 and 138 denote internal signals and numerals 139 and 141 denote signals to control the subscan direction magnification changing circuit 105.

FIG. 9 shows a timing chart for the signals 109-111 and 137-141 shown in FIG. 8. The operation will now be described.

The clock pulse signal 111 is used as a synchronizing signal for the system. The signal 139 which is a logical AND function of the signal 111 and the control signal 110 from the main scan control circuit is equivalent to the signal 111 from which the pulse signal at the time of the control signal 111 is deleted, and it is used as a synchronizing signal for the sub-scan direction magnification changing circuit 105. The signal 139 is also synchronized with the pixel data transfer signal 115. The counter 132 counts the number of pulses of the signal 139, that is, the number of transferred pixels and produces a pulse when the count reaches the number of pixels in one scan line. The signal 137 is thus a pulse signal synchronized with the start of each line scan. The line counter 133 counts the number of scan lines of the transferred pixels. The number of pixels of the divisional image in the sub-scan direction, that is, the number of scan lines is externally set to the comparator 134. If the number m is set and the count of the line counter 133 reaches m, the line counter 133 produces the signal 109. The signals 109 and 140 control the insertion time of the pixels (line) in the sub-scan direction and clear the line counter 133. The D flip-flop 136 delays the signal 140 by the scan line period and produces the signal 141. The sub-scan direction magnification changing circuit are controlled by the signals 139 and 141.

FIG. 10 shows one embodiment of the sub-scan direction magnification changing circuit. Numerals 151-153 denote shift registers each having as many stages as the number of pixels in one line, numeral 154 denotes a logical OR gate, numerals 155 and 156 denotes logical AND gates, numeral 157 denotes an inverter, numeral 158 denotes a logical OR gate, numeral 159 denotes a signal selection circuit and numerals 161-165 denote internal signals.

Figure 18:
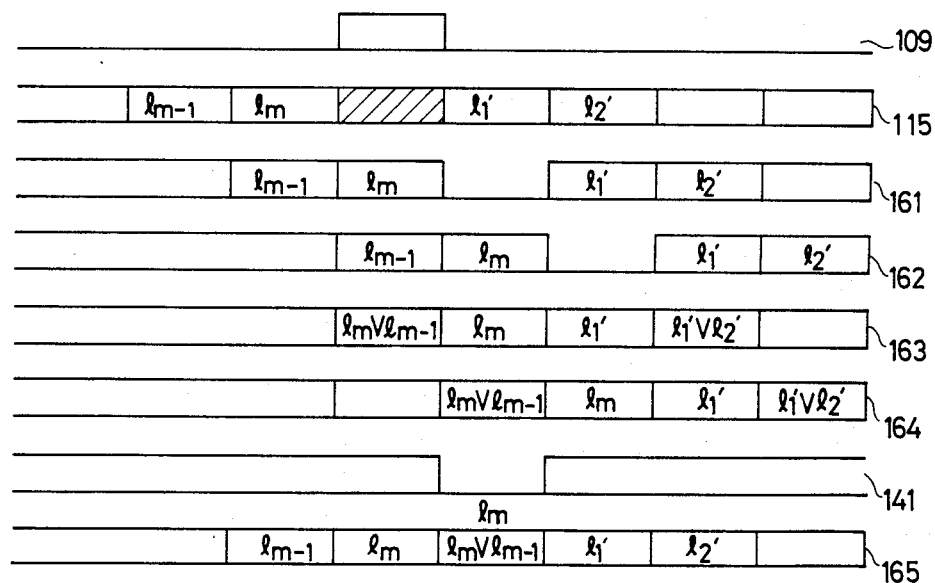
FIG. 18 shows a timing chart.

FIG. 18 shows a timing chart for the signals. The operation is described below.

The image data signal 115 is transferred from the image data transfer circuit 104 in a sequence shown in FIG. 18. A hatched area shows a period in which the image data is not transferred because of the control signal 109 as explained above. The image data signal 115 is supplied to the shift register 151 which produces the signal 161, which in turn is supplied to the signal selection circuit 159. The signal 161 is also supplied to the shift register 152 and the OR gate 154, which produces the signal 163, which in turn produces the signal 164, which is supplied to the signal selection circuit 159. The signal selection circuit 159 selects the signal 161 or the signal 164 in accordance with the control signal 141 to produce the signal 165. In the present embodiment, one line of pixels are inserted for each m lines so that the magnification is changed by a factor of $(m+1)/m$ in the sub-scan direction. The value m is supplied from one input unit 100 and hence it is variable.

In the above embodiment, lk is determined by the logical OR function of $l_{m-1}$ and $l_m$, although it is not restrictive.

FIG. 12 shows an embodiment of the main scan control circuit. Numeral 170 denotes a counter, numeral 171 denotes a comparator, numeral 172 denotes an inverter, numeral 173 denotes a shift register, numeral 174 denotes an AND gate and numerals 175–178 denote signals.

FIG. 13 shows a timing chart for the signals. The operation is now described.

The number of pixels (n) of the divisional image in the main scan direction is externally set to the comparator 171 through the signal line 108. The clock pulse signal 111 is counted by the counter 170 and the content thereof is compared with the value set in the comparator 171. When they are equal, the comparator 171 produces the signal 110. The signal 110 controls the image data transfer control circuit 101 and the sub-scan control circuit. The signal 176 clears the counter 170 and supplied to the AND gate 174 and the D flip-flop 173. The signal 176 supplied to the D flip-flop 173 is delayed on clock period and produced as the signal 178. The signal 111 is a system synchronizing signal, the signal 177 is a pixel insertion/deletion control signal, and the signal 178 is a signal selection control signal, and they are supplied to the main scan direction magnification changing circuit.

FIG. 14 shows an embodiment of the main scan direction magnification changing circuit. Numeral 180 denotes a D flip-flop, numeral 181 denotes an OR gate, numeral 182 denotes a signal selection circuit, numeral 183 denotes a D flip-flop and numeral 184–186 denote signals.

FIG. 15 shows a timing chart for the signals. The operation is explained below.

The signal 116 is supplied in a sequence shown in FIG. 15. In a period shown by a hatched area, $a_n$ is held by the control signal 110 supplied to the sub-scan control circuit 102 so that it has a double duration to those of other signals. The signal 116 is supplied to the D flip-flop 180 which produces the signal 184, which in turn is supplied to the signal selection circuit 182 and the OR gate 181. The OR gate 181 OR's the signals 116 and 184 to produce the signal 185. The signal selection circuit 186 selects the signal 184 or the signal 185 in accordance with the control signal 178 to produce the signal 186.

The relationship among the signals is shown in FIG. 15.

Figure 16:
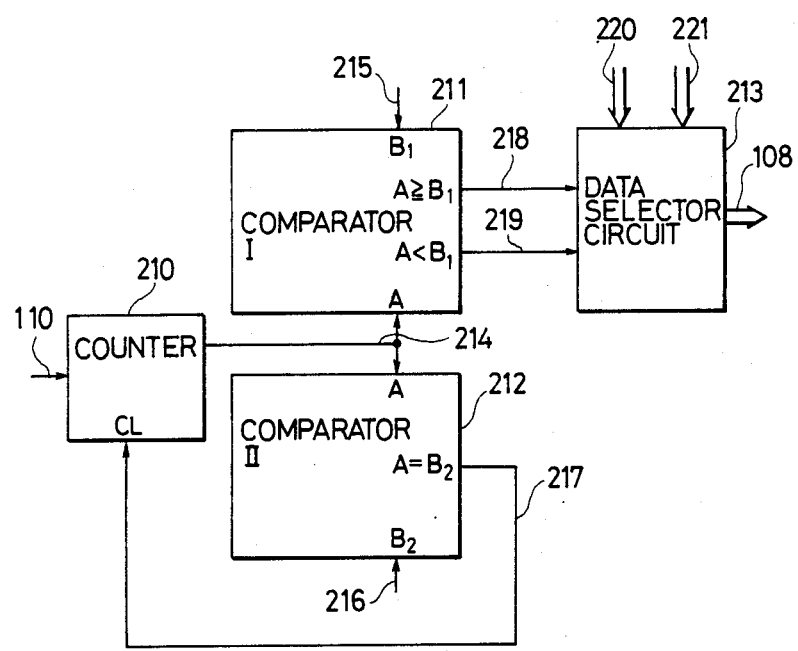
FIG. 16 shows a partial circuit of a data control circuit 200.

FIG. 16 shows a portion of the data control circuit 200. Numeral 210 denotes a counter, numerals 211 and 212 denote comparator I and comparator II, respectively, numeral 213 denotes a data selection circuit and numerals 214–221 denote signals. The operation is explained below.

The data control circuit 200 comprises input means such as panel switch for setting the total number of pixels in the image, the numbers of divisional images in the main scan direction and the sub-scan direction, and the numbers of pixels in the divisional images, and two identical control circuits for controlling the sub-scan control circuit 102 and the main scan control circuit 103, respectively, in accordance with the preset numbers of pixels in the divisional images. FIG. 16 shows one of the control circuits, that is, one for controlling the main scan control circuit 103.

In FIG. 16, the number n of the divisional images in one scan line determined by the equation (7), the number $n-k+n[k/n]$ of divisional images which represents the number of pixels in the divisional image determined by the equation (9) and the numbers of pixels in the divisional images determined by the equations (9) and (10) are set through the signal lines 216, 215, 220 and 221, respectively. The signal 110 is transferred one pulse at a time when the divisional image is to be magnified, that is, when the pixel is to be inserted, and the number of pulses is counted by the counter 210. The counter is compared with the values set in the comparators I and 11. The comparator II compares the count of the counter 210 with the number n of pixels of the divisional image in one scan line, and when they are equal, it produces the signal 217 to clear the counter 210. The comparator I compares the count of the counter 210 with the value $n-k+n[k/n]$ on the signal line 215 and if the former is smaller, it produces the signal 219 and if the former is equal to or larger than the latter, it produces the signal 218.

The data selection circuit 213 selects the signal 220 or 221 which carries the number of pixels in the divisional image determined by the equation (9) or (10), in accordance with the signal 218 or 219, respectively, to produce the signal 108.

By the circuit shown in FIG. 16, the number of pixels in the divisional image is changed to k from $n-k+n[k/n]$ per scan line, and to $[K/n]+1$ from $k-n[k/n]$ per scan line.

While the circuit for controlling the main scan control circuit 103 has been described, a similar circuit for controlling the sub-scan control circuit 102 is provided and it operates in a similar manner.

Since the number of pixels in the divisional image is determined in accordance with the equations (7)–(10) based on the numbers of pixels before and after the magnification, an error due to the magnfication and the equations (5) and (6) is eliminated and a high precision magnification process is attained.

The magnified image can be precisely inserted into any desired space.

As described hereinabove, according to the present embodiment, the number of pixels in the divisional image is determined not by the magnification but by dividing the image into as many divisional images as the difference between the numbers of pixels before and after the magnification so that one pixel is inserted or deleted when the divisional image is magnified. Accordingly, the error which would be created when the number of pixels is determined by the magnification is eliminated and the high precision magnification process is attained.

Since the magnification process is carried out based on the numbers of pixels before and after the magnification without depending on the magnification, the error due to the determination of the magnification is eliminated and the high precision magnification process is attained, and the image can be inserted into any space.

What is claimed is:

1. A method for changing a magnification of an image comprising the steps of:
    dividing the image into a number of divisional images;
    magnifying the divisional images; and
    combining the magnified divisional images, wherein, for a magnification in a range of (1, 2) or (½, 1), the image is divided into the divisional images such that each divisional image has a number of pixels which causes the number of pixels in a one-dimensional direction of the magnified or reduced image to be increased or decreased by one.

2. A method for changing a magnification of an image according to claim 1 wherein, for a given magnification A, the number m of pixels in onedimensional direction in the divisional image meets the following relations.

$$\text{When } 2 > A > 1 \quad m = \left[\frac{1}{A-1}\right] \text{ or}$$

$$m = \left[\frac{1}{A-1} + \frac{1}{2}\right]$$

$$\text{When } 1 > A > \frac{1}{2} \quad m = \left[\frac{1}{1-A}\right] \text{ or}$$

$$m = \left[\frac{1}{1-A} + \frac{1}{2}\right]$$

where [x] is the largest integer no larger than x.

3. A method for changing a magnification of an image according to claim 1 wherein one pixel is inserted into or deleted from the divisional image to be magnified or reduced.

4. A method for changing a magnification of an image according to claim 3 wherein a position of insertion or deletion of one pixel is designated prior to magnification or reduction of the divisional image.

5. A method for changing a magnification of a digital image by dividing the digital image into divisional images each having a number of pixels which causes a change of the number of pixels in each direction after the magnification of the divisional image, wherein the digital image is divided in each direction into a number of said divisional images equal to the difference between the numbers of pixels of said digital image before and after the magnification.

6. A method for changing a magnification of a digital image according to claim 5 wherein the numbers of pixels of the divisional images in the same direction may be different from each other.

7. A method for changing a magnification of a digital image according to claim 6 wherein the number of pixels in each divisional image is specified.

8. A method for changing a magnification of a digital image according to claim 6 wherein one pixel is inserted into or deleted from each divisional image to be magnified or reduced.

9. A method for changing a magnification of a digital image according to claim 9 wherein a position of insertion or deletion of one pixel is designated prior to magnification or reduction of the divisional image.

10. A method for changing a magnification of a digital image according to claim 6 wherein data derived by raster-scanning the image is serially magnified.

11. A method for changing a magnification of a digital image according to claim 6 wherein vertical and horizontal magnifications are different from each other.

12. An apparatus for changing a size of a digital image comprising:
means for dividing said digital image into divisional images each having a number of pixels which causes the number of pixels in each direction to be changed by one after the magnification or reduction of the divisional image;
means for changing the sizes of said divisional images; and
means for combining the divisional images having their sizes changed.

13. An apparatus for changing a size of an image, comprising:
input means for instructing magnification of the image;
dividing means for dividing the image into divisional images in response to the instruction for magnifying the image from said input means;
means for magnifying the divisional images; and
means for combining the divisional images as magnified by said magnifying means.

14. An apparatus for changing a size of an image according to claim 13 wherein said input means comprises means for designating magnification of any of a plurality of sizes.

15. An apparatus for changing a size of an image according to claim 14 further comprising means for determining a number of divisional images into which the image is divided by said dividing means in response to each input of a plurality of sizes of said input means.

16. An apparatus for changing a size of an image according to claim 13 wherein the image comprises a plurality of lines and a plurality of rows and wherein said dividing means divides the image into the divisional images such that the divisional images each comprise fewer lines and fewer rows than said image has.

17. An apparatus for changing a size of an image according to claim 16 wherein said magnifying means comprises means for increasing the number of lines or of rows of the divisional images.

* * * * *

UNITED STATES PATENT AND TRADEMARK OFFICE
CERTIFICATE OF CORRECTION

PATENT NO. : 4,686,580

DATED : August 11, 1987

INVENTOR(S) : YUZO KATO, ET AL.

It is certified that error appears in the above-identified patent and that said Letters Patent is hereby corrected as shown below: Title page:

AT [56] UNDER REFERENCES CITED/U.S. PATENT DOCUMENTS

Line 1, "Coyiello" should read --Coviello--.

COLUMN 4

Line 35, "image." should read --image,--.

COLUMN 6

Line 49, "denotes" should read --denote--.

COLUMN 7

Line 10, "not" should read --now--.
    Line 27, "supplied" should read --is supplied--.

COLUMN 8

Line 39, "below. When 2>A>1" should read --below.¶ When 2>A>1--.

COLUMN 9

Line 1, "not" should read --now--.
    Line 30, "pixels" should read --pixel--.

COLUMN 10

Line 60, "178," should read --1/2,--.

UNITED STATES PATENT AND TRADEMARK OFFICE
CERTIFICATE OF CORRECTION

PATENT NO. : 4,686,580

DATED : August 11, 1987

INVENTOR(S) : YUZO KATO, ET AL.

It is certified that error appears in the above-identified patent and that said Letters Patent is hereby corrected as shown below:

COLUMN 11

Line 31, "subscan" should read --sub-scan--.
Line 64, "white" should read --while--.

COLUMN 12

Line 39, "by the" should read --by one--.
Line 46, "denotes" should read --denote--.

COLUMN 13

Line 1, "one" should read --the--.
Line 23, "supplied" should read --is supplied--.

COLUMN 15

Line 9, "in onedimensional" should read --in a one-dimensional--.
Line 53, "claim 6" should read --claim 5--.

UNITED STATES PATENT AND TRADEMARK OFFICE
CERTIFICATE OF CORRECTION

PATENT NO. : 4,686,580

DATED : August 11, 1987

INVENTOR(S) : YUZO KATO, ET AL.

It is certified that error appears in the above-identified patent and that said Letters Patent is hereby corrected as shown below:

COLUMN 16

Line 4,  "claim 9" should read --claim 8--.
Line 8,  "claim 6" should read --claim 5--.
Line 11, "claim 6" should read --claim 5--.

Signed and Sealed this

Twenty-third Day of February, 1988

Attest:

DONALD J. QUIGG

Attesting Officer

Commissioner of Patents and Trademarks